No. 664,778. Patented Dec. 25, 1900.
J. & C. QUIST.
GEARING.
(Application filed Mar. 15, 1900.)

(No Model.)

Witnesses
Inventors
John Quist.
Charles Quist.
by H. R. Willson & Co.
Attorneys

THE NORRIS PETERS CO., PHOTO-LITHO., WASHINGTON, D. C.

UNITED STATES PATENT OFFICE.

JOHN QUIST AND CHARLES QUIST, OF MYSTIC, IOWA.

GEARING.

SPECIFICATION forming part of Letters Patent No. 664,778, dated December 25, 1900.

Application filed March 15, 1900. Serial No. 8,787. (No model.)

*To all whom it may concern:*

Be it known that we, JOHN QUIST and CHARLES QUIST, citizens of the United States, residing at Mystic, in the county of Appanoose and State of Iowa, have invented certain new and useful Improvements in Gearing; and we do declare the following to be a full, clear, and exact description of the invention, such as will enable others skilled in the art to which it appertains to make and use the same.

Our invention relates to gearing for imparting rotary reciprocating motion to the part to be driven or operated, as in certain kinds of washing-machines, churns, or the like devices; and it consists in the construction and novel combination of parts, as hereinafter fully described and claimed.

Figure 1:
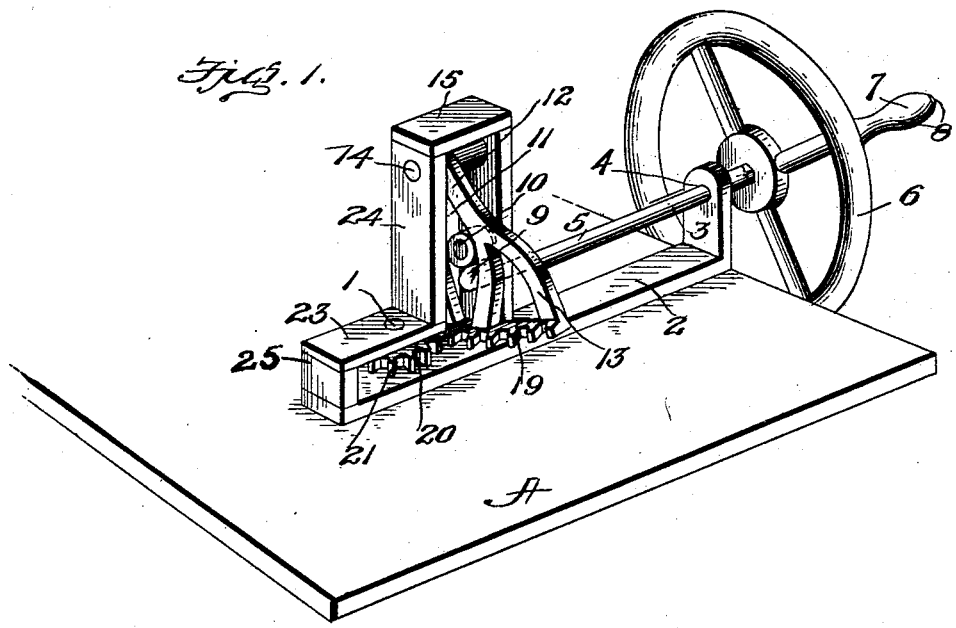
Figure 2:
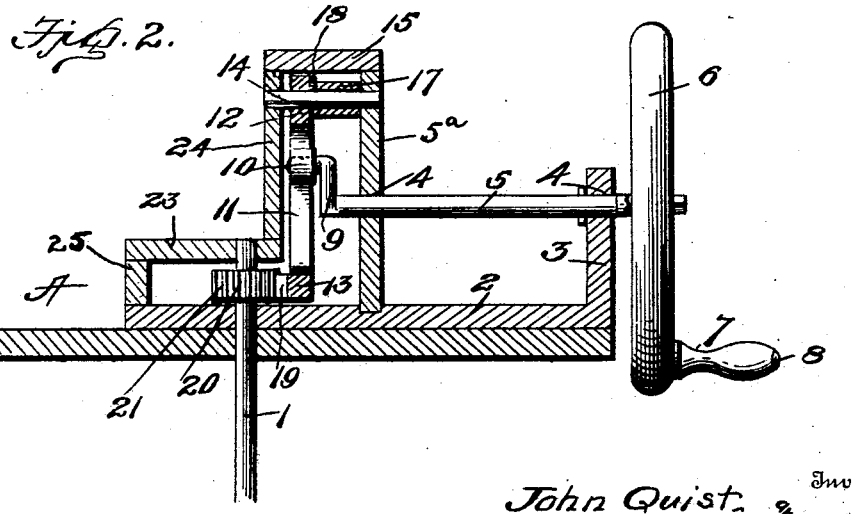

In the accompanying drawings, Figure 1 is a view in perspective of the gearing embodying improvements of our invention, and Fig. 2 is a vertical longitudinal sectional view.

Referring by reference characters to the accompanying drawings, A designates a suitable base, upon which our improved gearing is supported or with which it may be connected, so as to permit the vertical shaft 1 to depend below the same, in order that the improved gearing may be connected with the machine to be operated or driven, such as a washing-machine or the like.

2 is the bed-plate of the machine-frame, which is provided at one end with a vertical arm 3, which forms one of the bearings 4 for the crank-shaft 5, the outer end of which is tapered slightly and is rectangular in cross-section for a short distance at its end to receive the fly-wheel 6, which in this instance is a crank-wheel and is provided with a hand-piece 7, comprising an outwardly-projecting rod or stud, upon which is mounted a loose spool 8, which turns on the projecting rod and protects the hand of the operator while he is imparting the power to drive said gearing. At its inner end, or the power-imparting end, said shaft 5 is journaled in a standard 5$^a$ and provided with an integral crank-arm 9, which latter is provided with a friction-roller 10, which contacts with the surrounding wall of the eccentric slot 11 in the frame 12 of the segmental gear 13, journaled on the shaft 14 near the top portion or bridge-piece 15 of the gear-frame. The segmental gear 13 is loosely mounted on a short horizontal shaft 14, journaled in the parallel frame-standards 5$^a$ and 24, and is prevented from longitudinal play or movement on said shaft 14 by a spool 17 and a washer 18 for preventing wear of the contacting surfaces.

The standard 24 is L-shaped, and its arm 23 extends outwardly and is supported on the bed-plate 2 by a distance-block 25. The standards 5$^a$ 24, arm 23, bridge-piece 15, and distance-block 25 form, together with a portion of the plate 2, an L-shaped frame, in which the gearing is housed and mounted.

The outer face of the arc of the segmental gear 13 is provided with a set of teeth 19, which mesh with or engage the teeth 20 on the periphery of the pinion 21, fixed upon the vertical shaft 1 near its upper end and having its bearings in the bed-plate 2 and the adjacent parallel bar 23, connected with vertical arm 24. When the crank-shaft is operated by turning the fly-wheel or hand-wheel, the crank of the shaft imparts a laterally-swinging vibratory motion to the segmental gear, which, being in engagement with the pinion 21 upon the vertical shaft 1, imparts a rocking or oscillatory motion thereto, which is imparted to the washing-machine mechanism or other similar mechanism with which the improved gearing is connected.

Various changes in the form, proportion, and the minor details of construction may be resorted to without departing from the principle or sacrificing any of the advantages of this invention.

Having thus fully described our invention, what we claim as new, and desire to secure by Letters Patent of the United States, is—

In gearing for imparting rotary reciprocating motion, a frame comprising a horizontal bed-plate provided at one end with a vertical bearing-arm; a distance-block mounted vertically upon the opposite end of the bed-plate parallel with said arm; a vertical standard rising from the bed-plate; an L-shaped standard having its vertical body portion extending parallel with said vertical standard and its horizontal arm projecting outwardly above and parallel with the bed-plate and resting on said distance-block; and a bridge-piece joining the upper ends of said standards, in combination with gearing comprising a vertical shaft journaled in the bed-plate and horizontal arm of the L-shaped standard and carrying a pinion housed between said parts; a horizontal shaft journaled in the upper ends of the standards; a segmental gear mounted on said shaft to swing between the standards; a spool located on the horizontal shaft between one of said standards and the segmental gear; and a drive-shaft journaled in the said vertical arm of the bed-plate and the contiguous vertical standard and provided at its inner end with a crank-arm carrying a friction-roller to engage a slot in the segmental gear, substantially as set forth.

In testimony whereof we have hereunto set our hands in presence of two subscribing witnesses.

JOHN QUIST.
CHARLES QUIST.

Witnesses:
A. J. CARTER,
E. STEVENS.